(12) United States Patent
Bursch (10) Patent No.: US 10,352,490 B2
(45) Date of Patent: Jul. 16, 2019

(54) INTEGRATED FUEL PIPE CLAMP WITH SIMPLE ERGONOMIC FITTING STRUCTURE

(71) Applicant: Toyota Motor Engineering & Manufacturing North America, Inc., Erlanger, KY (US)

(72) Inventor: Eric F. Bursch, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 334 days.

(21) Appl. No.: 15/219,404

(22) Filed: Jul. 26, 2016

(65) Prior Publication Data

US 2018/0031162 A1    Feb. 1, 2018

(51) Int. Cl.
*F16L 37/14* (2006.01)

(52) U.S. Cl.
CPC .................. *F16L 37/144* (2013.01)

(58) Field of Classification Search
CPC ......... F16L 39/04; F16L 39/06; F16L 37/144; F16L 37/0841; F16L 37/086
USPC ............... 285/124.1, 124.3, 124.4
See application file for complete search history.

(56) References Cited

U.S. PATENT DOCUMENTS

| 4,264,047 A | 4/1981 | Nelson |
| 5,915,738 A | 6/1999 | Guest |
| 6,871,878 B2 * | 3/2005 | Miros ............ F16L 39/00 285/124.4 |
| 6,926,311 B2 * | 8/2005 | Chang ............ F16L 39/00 285/124.1 |
| 7,731,244 B2 * | 6/2010 | Miros ............ F16L 39/00 285/124.4 |
| 8,167,339 B2 | 5/2012 | Yagisawa et al. |
| 8,430,365 B2 * | 4/2013 | Benoit ............ F16L 5/14 285/124.4 |

(Continued)

FOREIGN PATENT DOCUMENTS

| DE | 102017108201 B3 * | 12/2017 | ............ F16L 37/144 |
| WO | WO-2014002606 A1 * | 1/2014 | ............ F16L 37/144 |

*Primary Examiner* — David Bochna
(74) *Attorney, Agent, or Firm* — Dinsmore & Shohl LLP (57) ABSTRACT

An integrated clamp assembly for fluid tubes, a fluid tube assembly and a method of connecting automotive fuel tubes. The assembly includes a clamp body with side-by-side channels for receiving complementary-sized side-by-side fluid tubes, a clamp cover, numerous quick connectors to fluidly join the ends of fluid tubes together, and a retaining clip for each quick connector to keep the end of one of the joined fluid tubes secured to the quick connector. The size of the quick connectors is such that when placed within a corresponding section of the channel formed in the clamp body, the smaller quick connector length provides an axially-compliant fit within the respective channel. This compliance makes it easier for an installer, manufacturer, assembler or related personnel to fluidly connect the ends of axially-adjacent fluid tubes together within the clamp in situations where manufacturing tolerances cause one of the side-by-side fluid tubes that is to be secured by the quick connector and retaining clip to project a different length along a fluid flow dimension than that of its neighboring fluid tube.

20 Claims, 7 Drawing Sheets

(56) References Cited

U.S. PATENT DOCUMENTS

| | | | |
|---|---|---|---|
| 2009/0069793 A1* | 3/2009 | DeCarlo | A61B 18/14 285/124.2 |
| 2014/0062078 A1 | 3/2014 | Weissmann | |
| 2016/0040822 A1 | 2/2016 | Cetnar et al. | |

* cited by examiner

INTEGRATED FUEL PIPE CLAMP WITH SIMPLE ERGONOMIC FITTING STRUCTURE

TECHNICAL FIELD

The present disclosure generally relates to joining sections of automotive fuel tubes, and more particularly to the integrated use of quick connectors and housing-like clamps in order to provide simple, secure connection between such axially-aligned fuel tubes.

BACKGROUND

Automotive fuel tubes (also called fuel lines or fuel pipes) often extend considerable distances over the length of a vehicle to deliver gasoline, diesel or related fuel to the engine. Ends of these fuel tubes are often joined to adjacent axially-aligned body-side connection floor tubes that receive fuel from the vehicle-mounted storage tank. Given the lengthy nature of the tubes used in a vehicular fuel delivery system, such joining of these modular segments is preferable in that it improves system handling and overall manufacturability. In one form, the joining is often through the use of quick connectors that are in turn secured in place by one or more housing-like clamps that can be mounted or otherwise secured to an adjacent part on the underside of the vehicle. These conventional clamps have channels formed on their inner surface that are sized to snugly receive the fuel tube and floor tube ends, while the quick connector acts as the intermediate structure between the tubes and the inner surface of the clamp, as well as a fluidly-tight connection between a fuel tube and its respective floor tube. The quick connectors significantly improve tube assembly efficiency relative to configurations that require tools, separate fasteners or the like, while the clamps act as a protective enclosure against the ambient environment such as foreign object impact, exposure to road salt or other corrosive agents, or vibrations that are associated with the operation of a vehicle.

Because the number of mounting and routing locations within a vehicular environment are limited, it has become an accepted practice for the fuel tubes and their floor tube counterparts to have groups of two tubes be arranged in a laterally adjacent (i.e., side-by-side) assembly format. In one approach, these side-by-side tubes may include a first relatively high pressure line for delivery of the fuel from the fuel pump to the engine's fuel injector, and a second relatively low pressure return line back to the fuel tank for any excess fuel, vapor or both. Unfortunately, lengthwise manufacturing and assembly tolerances between these side-by-side tubing assemblies (especially as it relates to the floor tubes) frequently results in the length of one of the tubes differing from that of the other, even if only by a few millimeters. From a joining and attachment standpoint, this axial length difference makes it difficult to coax both of the side-by-side tubes together into the quick connectors and their respective close-tolerance channels formed in the clamp without applying an excessive amount of pulling or pushing force along the axial (i.e., thrust) direction. Such a scenario is unsatisfactory in that the additional force could lead to breakage of the joined tubes, as well as detract from the ergonomic assembly benefits that the quick connectors were designed to facilitate. This difficulty is compounded when attempts are made to attach the retaining clips, as an installer needs to be simultaneously holding two tubes and quick connectors in place while attempting to make a snap-fit connection between the retaining clips and the quick connectors. This connection may be made even more difficult in configurations where collars or related lateral projections in the floor tubes that are used to secure the tubes to an inner surface of the quick connector are present in that such collars tend to—when axially misaligned—form an obstruction to the snap-fit connection between the quick connector and the tube retaining clip.

Accordingly, a need exists for a clamp assembly that reconciles the competing objectives of improved manufacturing ergonomics and improved tube fluid-containment and structural integrity.

SUMMARY

In one embodiment, an integrated clamp assembly for fluid tubes is disclosed. The assembly includes a clamp body, numerous quick connectors and retaining clips that upon connection to one another provide a housing-like enclosure for at least a pair of side-by-side fluid (i.e., laterally-adjacent) tubes. The body has numerous side-by-side channels formed therein such that they can accept placement of fluid tubes, while the cover can be coupled to the clamp body to define between them at least a partial enclosure for the channels. For each channel there is an equivalent quick connector and corresponding retaining clip. Each of the retaining clips fits together with a respective one of the quick connectors such that a resiliently-biased snap-fit engagement is formed between them. Importantly, each quick connector is shaped to fit within a respective clamp body channel such that the channel helps keep the quick connector substantially aligned along the channel axial dimension. The quick connector provides an end location for a pair of axially-aligned tubes to be fluidly joined to one another, while its size is such that it provides an axially-compliant fit when placed within a cooperating portion of a respective one of the channels. In this way, the axially-compliant channel can accommodates relative variations in the placement of the assembled quick connector, retaining clip and joined tube sections along an axial (i.e., fluid-flow) dimension of the channel. Unlike placement of a quick connector within a channel of a conventional clamp assembly, the axially-compliant fit of the present disclosure avoids manufacturing or assembly problems associated with such variations that result from tolerances and the accompanying difference in length of one of the fluid tubes from its laterally-adjacent neighbor. In particular, the assembly of the present disclosure promotes ergonomic manufacturing or installation of the axially-aligned fluid tubes such that no exaggerated pushing or pulling of one of the side-by-side tubes in order to assure that they terminate at a comparable axial position is required. In one form, the integrated clamp assembly may be used in conjunction with fuel tubes that make up fuel delivery and return lines for a vehicular fuel system.

In another embodiment, a fluid tube assembly is disclosed. The assembly includes numerous first fluid tubes arranged in a substantially side-by-side relationship with one another in at least their respective terminal (i.e., end) regions, as well as numerous second fluid tubes arranged in a substantially side-by-side relationship with one another in at least their respective terminal regions. Each of the first fluid tubes include a locking member, while each of the second fluid tubes can be fluidly joined to a respective one of the first fluid tubes upon axial alignment and common attachment to one another within one of the channels of the clamp body. The assembly further includes an integrated clamp assembly made up of at least a clamp body that has side-by-side fluid tube-receiving channels formed therein, numerous quick connectors and a corresponding number of retaining clips each of which is cooperative with a respective one of the quick connectors and one of the first fluid tubes. In this way, a snap-fit engagement may be formed between the connector, clip and inserted first tube. Furthermore, each of the quick connectors are sized and shaped to define an axially-compliant fit within a respective one of the channels when situated therein to promote ergonomic assembly or installation in the manner discussed in the previous embodiment. In one form, the fluid tube assembly may be configured as the fuel delivery and return lines for a vehicular fuel system.

In yet another embodiment, a method for connecting automotive fuel tubes is disclosed. The method includes providing a clamp body that defines a pair of side-by-side tube-receiving channels, as well as providing a pair of first fuel tubes and a pair of second fuel tubes both of which are arranged in a substantially side-by-side relationship such that their terminal regions can inserted into respective axial ends of corresponding quick connectors that in turn fit within a corresponding channels in the clamp body. The terminal or end region of one tube set is placed into opposing ends of the quick connectors from those of the other tube set, where each of the tubes of the first fuel tube set are secured to a respective quick connector through a retaining clip that is cooperative with both such that a resiliently-biased snap-fit that is formed in at least one of the retaining clip and the quick connector engages a locking member that is situated on or otherwise formed as part of the tube. At least one section of both the quick connector and the channel are sized and shaped to define an axially-compliant fit between them such that the fit accommodates relative variations in the placement of the secured quick connector, retaining clip and first fluid tube along a fluid-flow dimension. In this way, the variations that arise as a result of one of the first fluid tubes projecting a different length along the fluid flow dimension than that of the other first fluid tube are meliorated, permitting ease of joining of each of the first fuel tubes to the assembled clamp, second fuel tubes, quick connectors and retaining clips.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to promoting ease of quick-connect coupling between joined axial sections of side-by-side tubes to take into consideration manufacturing or assembly tolerances that have a tendency to produce side-by-side tube length variances that make it more difficult to fluidly join tube ends to their axial (i.e., fluidly-coupled) counterparts within a clamp. In one notable example, the device and approach discussed herein preserves the ergonomic assembly efficiencies associated with the use of quick connectors for fuel lines while also maintaining a substantially fluid-tight connection to avoid compromising the sealing integrity between the tube and the clamp. In particular, the axial length of the clamp's quick connector-receiving channel is lengthened so that even with an axial misalignment of side-by-side fuel lines, no undue insertion force is required, as the lengthier channel has enough tolerance built in to accommodate such a difference in length. As such, the embodiments discussed herein simultaneously promote ergonomic ease of joining axially adjacent ends of tubes along with maintenance of sealing integrity in the region between the clamp and joined tubes.

Referring first to FIGS. 1A through 3, a conventional clamp 100 comprising a body 110 with a pair of channels 120, 130 and a cover 150 is shown. Clamp body 110 defines an axial dimension A along the length of the channels 120, 130 and a lateral dimension L; these dimensions correspond to fluid-flow and side-by-side dimensions, respectively. Within the present context, the terms "fluid-flow" and "axial"—when used to designate dimensions—along with their variants are understood to be interchangeable, as are the terms "lateral" and "side-by-side". Numerous ribbed portions 115 within the semicircular channels 120, 130 tend to provide rigidity to the clamp body 110. Slots 140 are formed on the opposing lateral sides of the clamp body 110, and can accept tabs 155 that are disposed on comparable lateral sides of the cover 150 in order to provide a resiliently-biased snap-fit connection between them. Within the channels 120, 130, there are separate sections 125, 135 that define radially-exaggerated compartments 125A, 135A in an effort to accommodate the placement of retaining clips (not shown) that are used to secure a quick connector 170 that is used to fluidly join opposing ends of one set of fluid tubes 180, 190 to another set 185, 195.

Figure 1A:
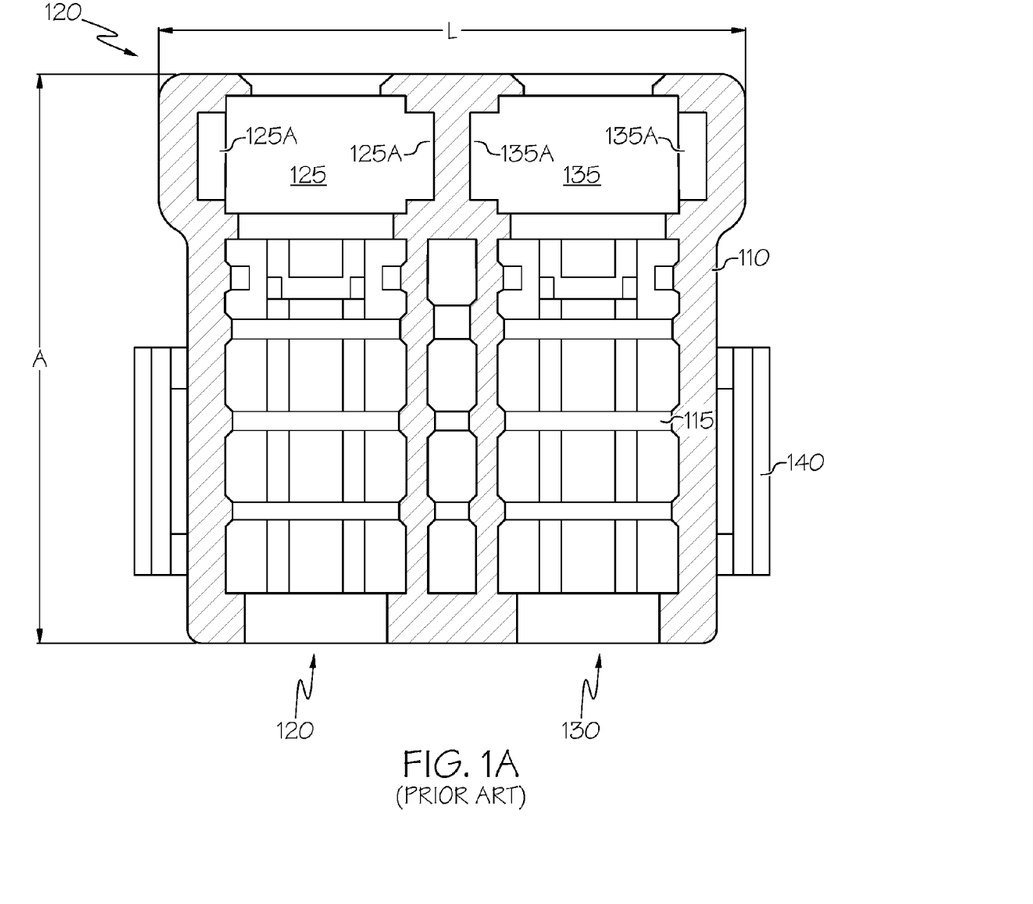
FIG. 1A depicts a top view of the body of a conventional clamp body according to the prior art that is used to join a pair of fuel tube sections to their floor tube counterparts.
Figure 1B:
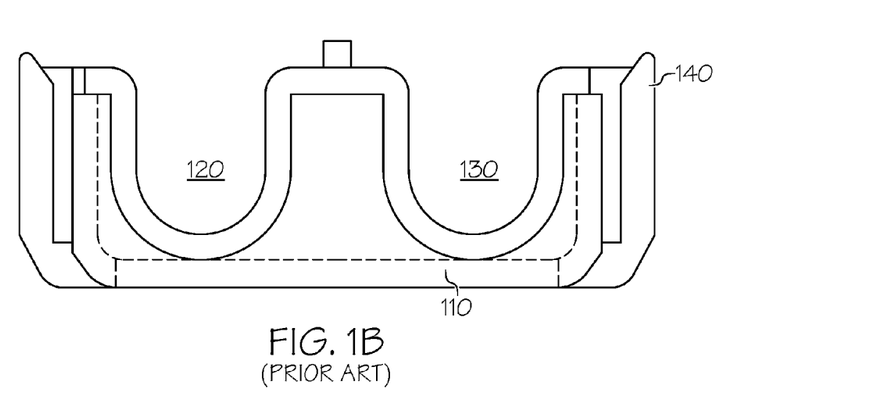
FIG. 1B depicts an end elevation view of the body of FIG. 1A.
Figure 2A:
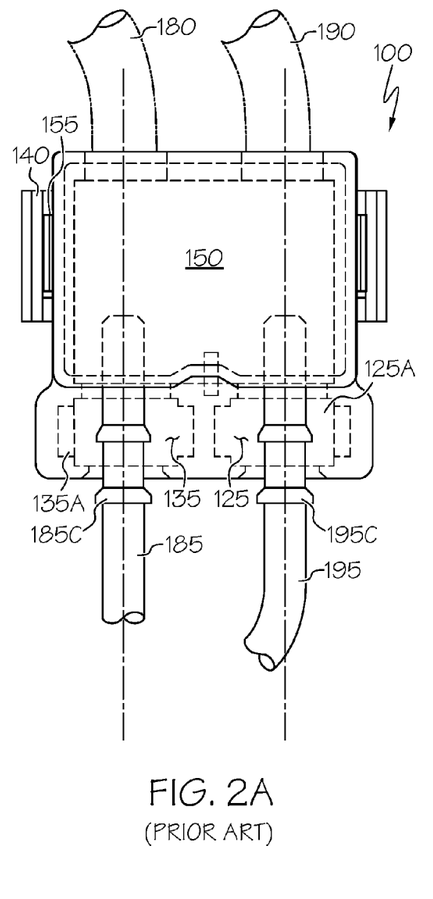
FIG. 2A shows a pair of side-by-side quick connectors as placed into the channels of a clamp when there is no axial misalignment between the connectors.
Figure 2B:
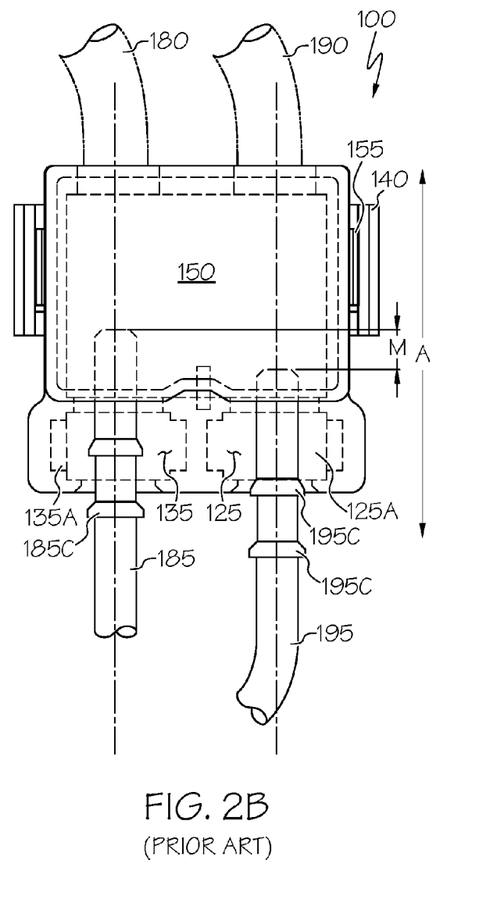
FIG. 2B shows a pair of side-by-side quick connectors as placed into the channels of a clamp when there is an axial misalignment between the connectors.
Figure 3:
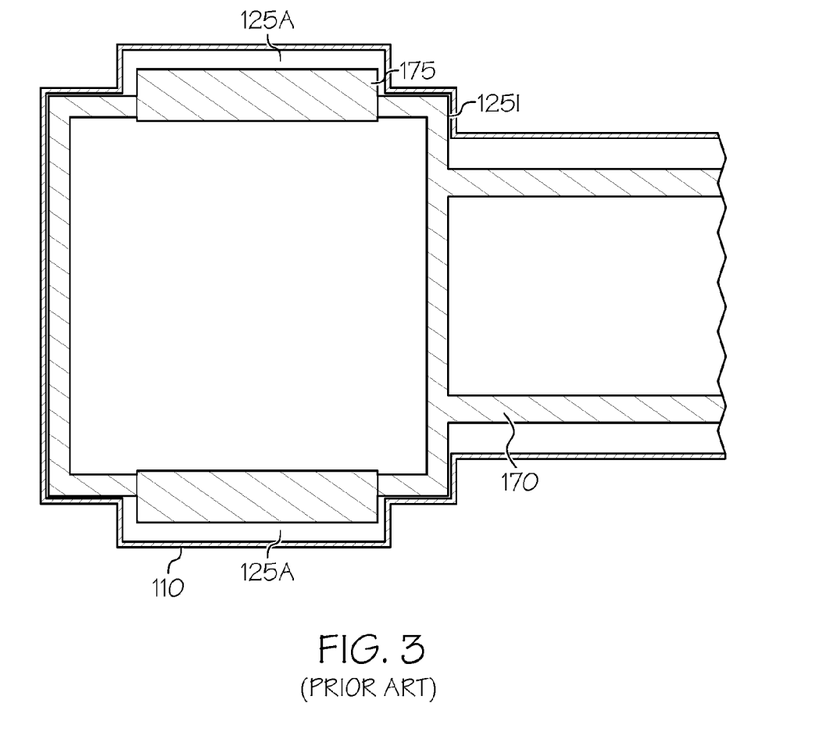
FIG. 3 shows a simplified cross-sectional view of the placement of a conventional quick connector into the channel that highlights that there is no axially-compliant fit between them in a conventional clamp according to the prior art.

Referring with particularity to FIGS. 2A and 2B, despite the exaggerated radial compartments 125A, 135A along the lateral dimension L, there is no longitudinal room with the channel sections 125, 135 to accommodate differing lengths along the axial (i.e., fluid-flow) dimension A in situations where there is axial misalignment between the floor tubes 185, 195 that make up the second tube set. In fact, there is typically an interference fit 125I. This lack of room means that any attempt by installation or assembly personnel to place both of the floor tubes 185, 195 into the quick connectors 170 is met with resistance, especially given that the floor tubes 185, 195 are typically made from a relatively rigid material (such as steel or the like). A comparison between the situations where such axial misalignment M is and is not present is shown with particularity in FIGS. 2A (the latter) and 2B (the former). Because of the tight axial dimension tolerance between the quick connectors 170 and the walls of the clamp body 110 that form the channel section 125, 135 (only the first of which is shown in FIG. 3) there is not enough axial room within the channel section 125, 135 to permit ergonomically simple adjustment of the axial position of one of the first fuel tubes 185, 195. Moreover, in cases where axial misalignment M is present as shown in FIG. 2B, one of the locking members 195C may be in a location that interferes with the locking connection formed by a quick connector or retaining ring (neither of which are shown), thereby further compounding the tube-joining process.

As can be seen in an ideal placement in FIG. 2A, when both floor tubes 185, 195 extend the same distance along the axial dimension A, the process of inserting them into the clamp 100 is rather straightforward. In such circumstance, the size and placement of the side-by-side channels 120, 130 is such that the fuel tubes 185, 195 in general and the locking members 185C, 195C in particular can be inserted and secured within their respective channels 120, 130 with a normal amount of effort. Contrarily as can be seen in a typical (and often far more common) placement in FIG. 2B, when one of the floor tubes 185, 195 extend a different distance along the axial dimension A from one another, the process of inserting them into the clamp 100 becomes much more difficult. In particular, the relative rigidity of the floor tubes 185, 195, coupled with the relatively small insertion space defined by the clamp 100 in general and the floor tube-receiving sections 125, 135 in particular, causes a significant increase in the degree of complexity required to perform a fluidly-secure and timely joining of these tubes to their fluidly-coupled counterpart fuel tubes 180, 190. Even more particularly, this requires additional pushing or pulling force by installation personnel to ensure the correct degree of collinear positioning of the axially-adjacent floor tubes 185, 195 during their insertion into the clamp 100. Given that such a process typically takes place within the context of a highly-organized automotive fuel delivery system manufacturing or assembly environment, this added complexity can lead to significant losses in productivity, higher levels of personnel fatigue and increased likelihood of a defective fluid joint being formed between floor tubes 185, 195 and their respective fuel tubes 180, 190. This difficulty is exacerbated when the floor tubes 185, 195 include locking members 185C, 195C, as the presence of these protuberances within an improper axial location of the already-tight confines of the floor tube-receiving sections 125, 135 of the clamp 100 could preclude the possibility of engaging a retaining clip or other tube-securing device.

Figure 4A:
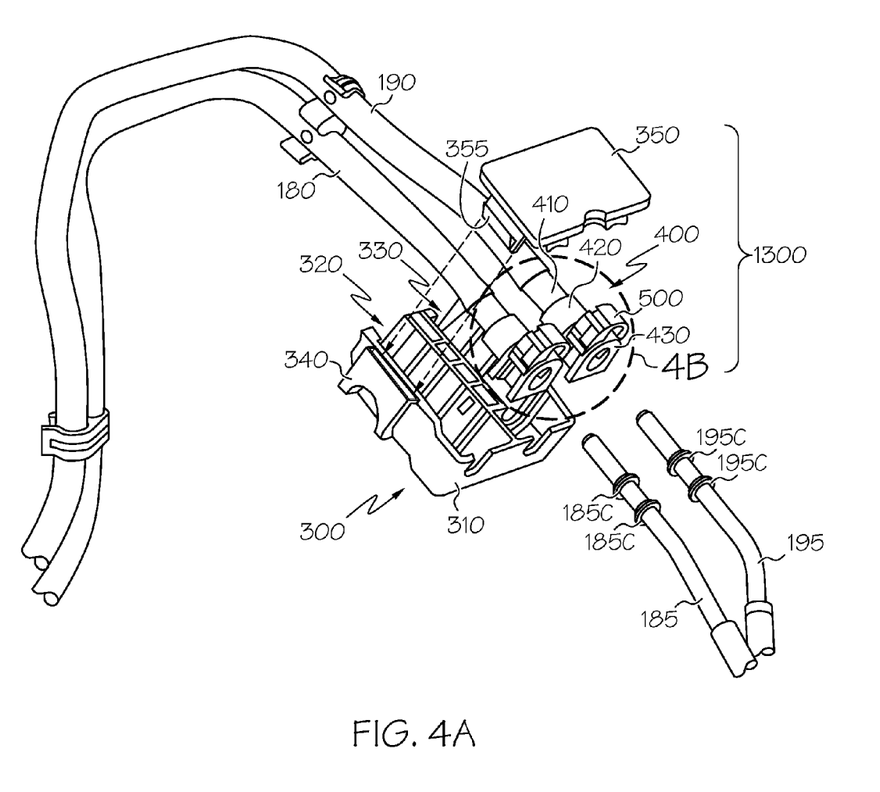
FIG. 4A shows an exploded perspective view of an integrated fuel tube clamp assembly and connection to fuel and floor tubes of a fuel delivery system according to an aspect of the present disclosure.
Figure 4B:
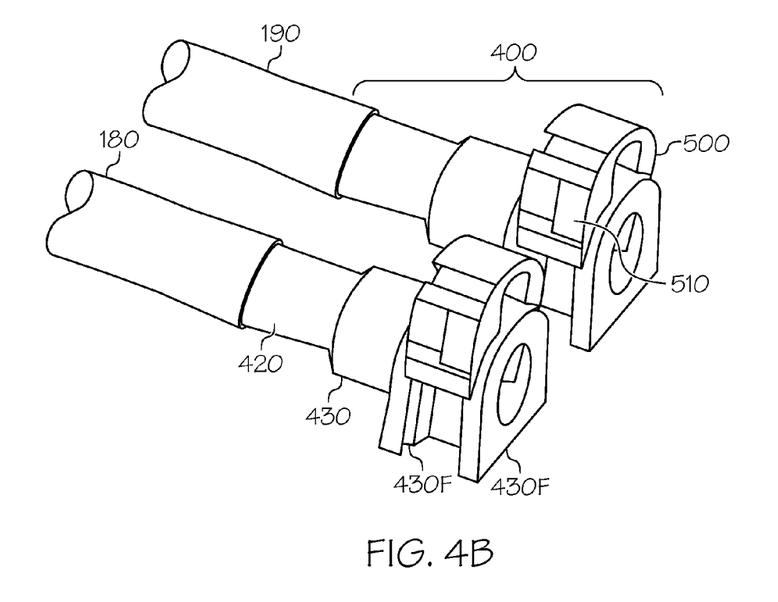
FIG. 4B shows a detail view of the portion of FIG. 4A where both fluid coupling of the quick connectors to one set of fluid tubes at one end and placement of the retaining clip at the other end are highlighted.
Figure 4C:
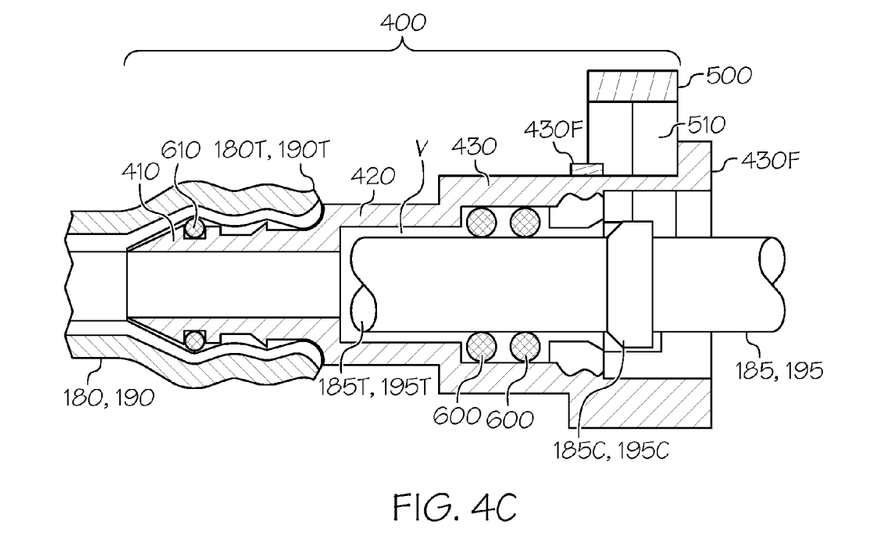
FIG. 4C shows a cross-sectional view of more details of FIG. 4B where a first and second fluid tube are fluidly coupled to one another along their fluid-flow dimension within the quick connectors, along with a partially-engaged retaining clip.

Referring next to FIGS. 4A through 4C, in an automotive fuel delivery system, fuel being stored in a tank is pressurized by a pump (neither of which are shown) and delivered through the floor tube 185. After being fluidly coupled to corresponding fuel tube 180 within assembly 1300, the fuel is delivered to the fuel injectors within the engine for subsequent introduction into the combustion chamber. Within the present context, the floor tubes 185, 195 can have one of many functions, including (1) high pressure delivery to the engine, (2) low pressure delivery to the engine, (3) return line to the fuel tank and (4) vapor line to the engine. By way of example, in a situation where excess fuel is not used, it can be returned through a low pressure fuel tube 190 and corresponding floor tube 195 to the tank, also passing through the fluid coupling formed in the assembly 1300 between fuel tube 190 and floor tube 195. As can be seen, the side-by-side arrangement of both the high-pressure and low-pressure tubes are grouped together as a set to promote ease of mounting to or related securing to various underbody surfaces of the vehicle. Both sets of tubes define a generally circular cross-sectional profile, and maintain generally parallel flowpaths relative to one another, at least in a region near their respective terminal ends.

Assembly 1300 based on clamp 300, quick connector 400 and retaining clip 500 is shown in exploded form. When coupled together, they provide a secure housing-like enclosure where fuel tubes 180, 190 and introduced at one axial end of a clamp body 310 while their respective floor tubes 185, 195 are introduced at the other axial end of a clamp body 310. The body 310 defines an exterior surface housing that has two passages or channels 320, 330. A cover 350 can be snap-fit onto the body 310 through cooperative engagement between cover-mounted resilient tabs 355 and body-mounted slot 340 in order to enclose the joined tubes 180 to 185 and 190 to 195 within the channels 320, 330. As can be seen, the channels 320, 330 define an elongate profile in the body 310 along an axial fluid-flow dimension. Although not shown, clamp 300 includes features to allow it to be secured to a suitable surface of a vehicle, such as an underside of the chassis, a wheel well or the like. In one form, the clamp body 310 is of a floating type such that there is no direct attachment or securing to the body of the vehicle. These and related clamp variants are deemed to be within the scope of the present disclosure.

At the axial end of the clamp 300 where the fuel tubes 180, 190 are introduced, the first section 410 of the quick connector 400 is press-fit into the tubes 180, 190. In one preferred form, the material making up both the quick connector 400 and the fuel tubes 180, 190 is a resin-based material, such as those from the polyamide series, the polyester series or the like. Notable examples include polyphenylene sulfide (PPS), various nylon-based materials (such as polyamide 11 or polyamide 12), polybutylene terephthalate (PBT), polyethylene terephtalate (PET), polyethylene naphthalate (PEN) or the like. Each exhibits robust swelling resistance with prolonged exposure to gasoline, low liquid penetrability, as well as heat resistance and low manufacturing cost. One particular material (polyoxymethylene, POM) has been shown to be particularly suitable for the clamp 300, as it possesses heat and fuel resistant, along with relatively low cost. Importantly, the use of POM— while suitable for the fuel clamp 300—is preferably not used for the fuel tubes 180, 190, quick connector 400 or other parts as it doesn't have the material properties to handle continuous exposure to fuel in the way that nylon 12 or other materials do. In one optional form, because the materials start as resins, they can also have glass fibers or other discontinuous reinforcements added in order to enhance the strength, damage-tolerance or other desirable properties as needed. In one form, it is desirable that the material used for the quick connector 400 be the same as that for the fuel tubes 180, 190, in order to promote as much fuel penetrability resistance and heat resistance as possible. In one form, there may also be an ethylene propylene diene monomer (EPDM) cover to provide additional heat, weather and vibration resistance). Contrarily, the floor tubes 185, 195 are preferably made from a metal-based material such as steel. In addition, since they are designed to be placed along the vehicle underbody, they preferably also include a resin-based coating on their outer dimension in order to reduce the chance of being damaged by road detritus, as well as to provide increased oxidation and pitting resistance.

At the axial end of the clamp 300 where the floor tubes 185, 195 are introduced, the third section 430 of the quick connector 400 is already coupled to the tubes 180, 190 through their connection in one or both of the first and second sections 410, 420. Although the quick connector 400 is shown preferably with three sections 410, 420 and 430 each of which defines a larger radial profile than the previous section, it will be appreciated that a different number of sections, as well as different radial profiles, may be included depending on the need. Moreover, the axial-dimension length of the quick connector 400 as a whole and its three sections 410, 420 and 430 are made to promote compact, secure seating within the channels 320, 330 of the clamp body 310. As will be discussed in more detail below, one section 430 of the quick connector 400 and its corresponding channel section 325, 335 are particularly sized relative to one another along their axial dimension to promote what is referred to herein as an axially-compliant fit between them that forms a significant part of the construction of assembly 1300.

The retaining clip 500 defines a horseshoe-shaped profile so that it can be slipped like a collar over the corresponding part of the quick connector 400. In one preferred form, the retaining clip 500 is purposely designed to allow an automobile assembler, fuel system installer or other personnel to know with a high degree of certainty that that the floor tube 185, 195 is properly seated when latching the retaining clip 500 to the quick connector 400. As such, if the retaining clip 500 and quick connector 400 become difficult to engage with one another, then the assembler or installer realizes that the floor tube 185, 195 needs to be inserted farther into the quick connector 400 until it is easy to engage. This prevents mis-assembly and potential fuel leaks. In one form, the retaining clip 500 is made from a resin-based material similar to that used for the quick connector 400 above. The retaining clip 500 defines an aperture that extends through its axial dimension, where the diameter of the aperture is sufficiently large to allow the passage of both the terminal ends 185T, 195T of the floor tubes 185, 195 as well as at least one of the circumferential locking members 185C, 195C that are formed integrally thereon. In addition, one or more resiliently-biased tabs 510 are integrally formed on the retaining clip 500. In one form, this resilient bias is formed by having the end of the tab 510 that is designed to selectively engage the locking members 185C, 195C be of a cantilevered construction. In this way, once the floor tubes 185, 195 have been inserted into the third section 430 of quick connector 400 an adequate distance along the fluid-flow dimension, the tab 510 that was temporarily displaced from its biased position snaps back over the locking members 185C, 195C, thereby making it difficult to reverse the direction and pull the floor tubes 185, 195 out. Slots formed in the third section (which in an equivalent form may be defined axially-spaced by flanges 430F on the third section 430) help promote secure, repeatable engagement of the quick connector 400 and its corresponding retaining clip 500.

The floor tubes 185, 195 are inserted into the quick connector 400 to make a seal via two O-rings 600. As can be seen with particularity in FIG. 4C, the fluid sealing takes place within the interstitial volume V between the outer surface of the floor tubes 185, 195 and the inner surface of the second section 420, third section 430 or both of the quick connector 400. In this way, there is no need to rely upon the clamp body 310 and cover 350 for fluid containment, as all sealing features are internal to the quick connector 400. As such, the two O-rings 600 seal the fuel from leaking out of the joint that is formed between the terminal ends 180T, 190T of the fuel tubes 180, 190 and the terminal ends 185T, 195T of the floor tubes 185, 195. An additional O-ring 610 is shown within the barbed end that corresponds to the first section 410 of the quick connector 400 and helps prevent leakage between the quick connector 400 and the fuel tube 180, 190, specifically as it relates to the terminal ends 180T, 190T of the fuel tubes 180, 190.

Figure 5:
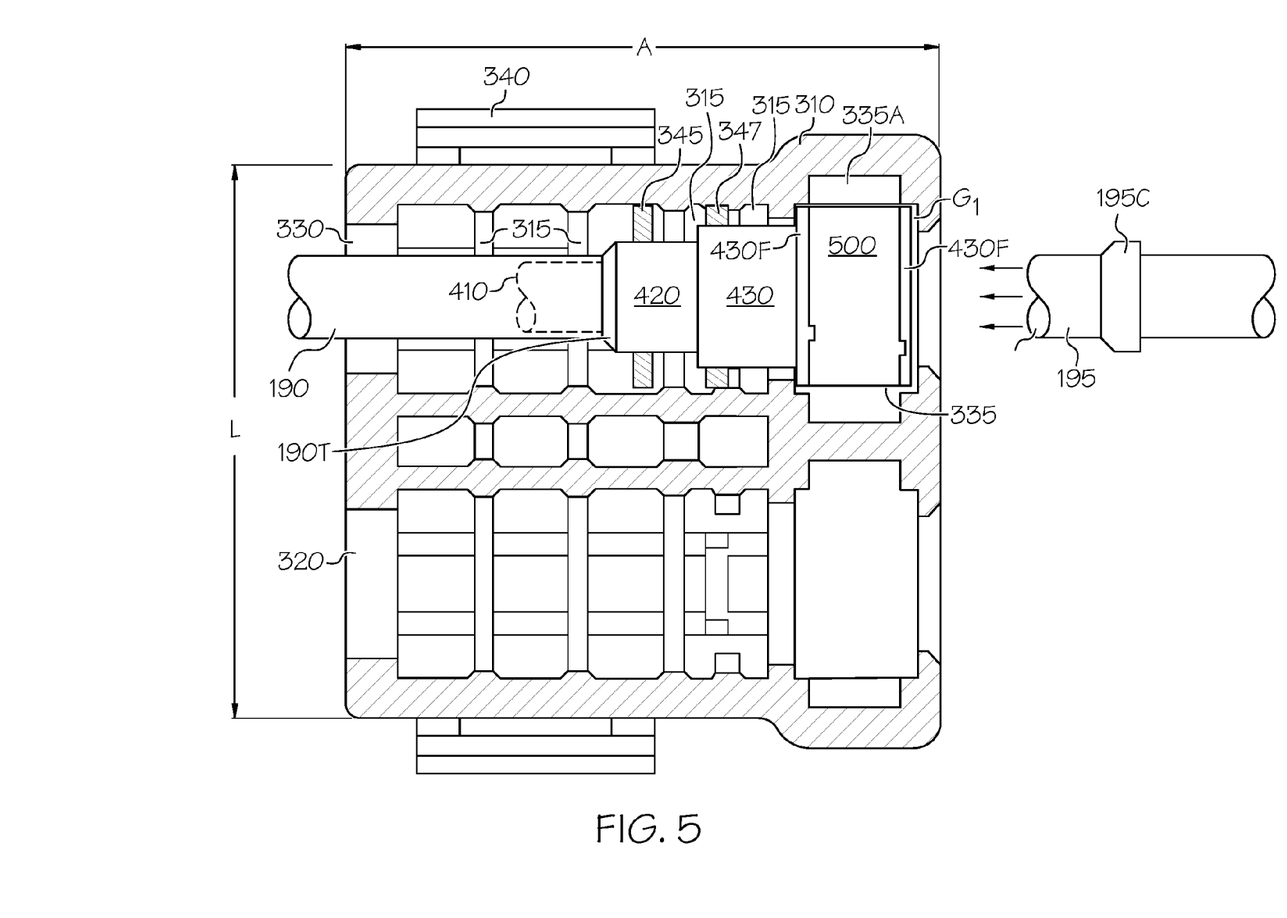
FIG. 5 depicts a top view of the body of a clamp body according to an aspect of the present disclosure, where one of a pair of side-by-side fluid tubes is being inserted into the clamp.

Referring next to FIG. 5, a top view of the placement of one quick connector 400 that is already attached at one of its axial ends to a fuel tube 190 within channel 330 is shown just prior to the insertion of the fluidly-companion automotive floor tube 195 into its other axial end. Although shown for simplicity with only a single floor tube 195, it will be appreciated that a significant benefit according to the present disclosure occurs when both side-by-side floor tubes 185, 195 are introduced into the clamp body 310 simultaneously; in that way, even if there is a difference in axial (i.e., fluid-flow) dimension length of one of the floor tubes 185, 195 relative to the other (such as due to manufacturing or related length tolerances), the axially-compliant fit formed between the quick connector 400 and the respective channel 320, 330 is sufficient to allow enough so-called "play" in the two floor tubes 185, 195 to allow them to both be substantially simultaneously inserted into the quick connectors 400 that are already secured in the clamp body 310 without the application of an unduly large amount of axial pushing or pulling by the installer, assembler, manufacturer or related personnel. As discussed herein, such avoidance of undue force promotes ergonomic assembly and installation of the automotive fuel lines. In addition to stiffening ribs 315, the channel 330 as various axially-spaced mounts 345, 347 that can be used to promote proper axial alignment of the quick connector 400 within the clamp body 310.

Figure 6:
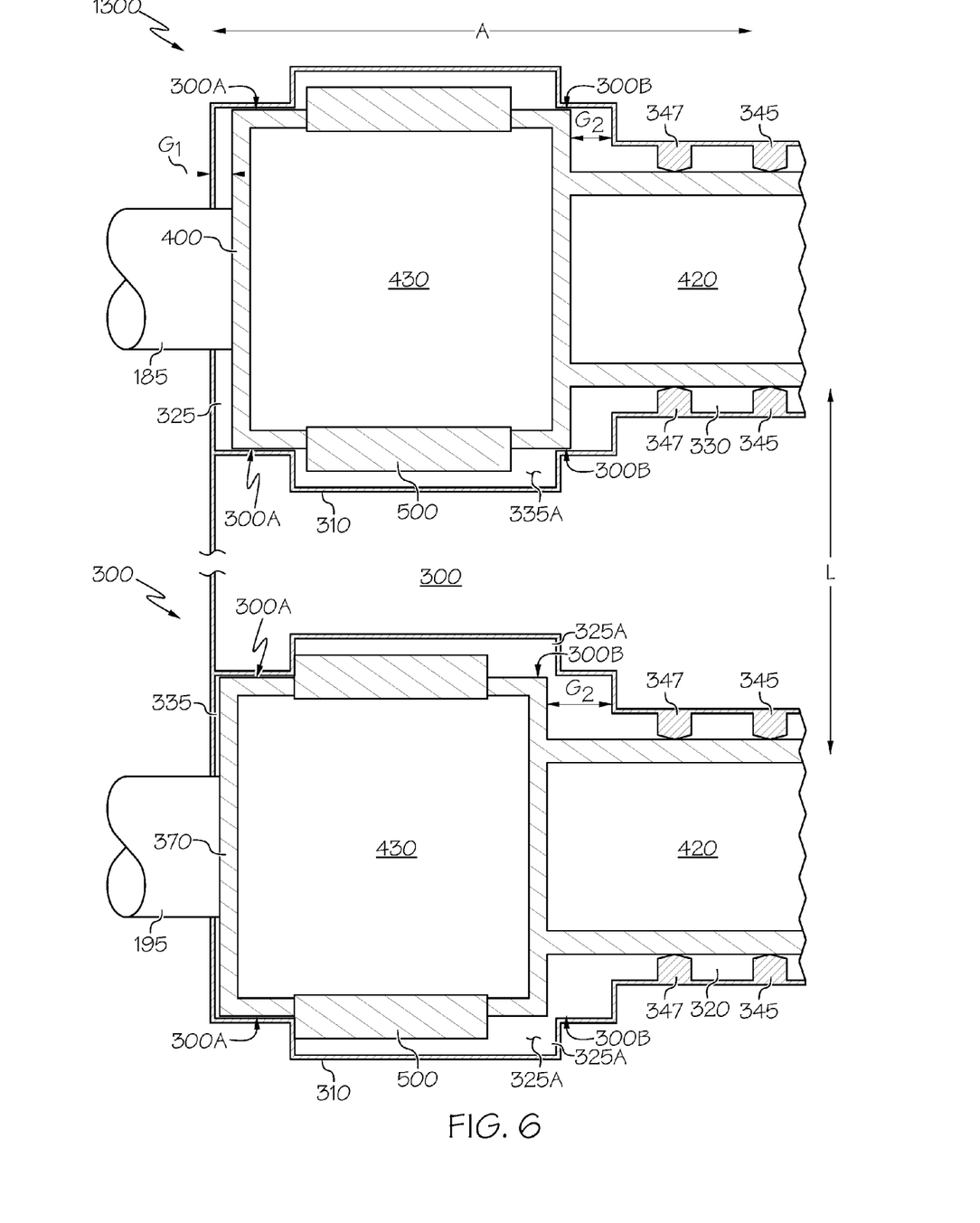
FIG. 6 shows a simplified cross-sectional view of the placement of a quick connector and retaining clip highlighting the axially-compliant fit that can be had between the section of the quick connector that accepts the retaining clip and the corresponding section of the channel in situations where laterally-adjacent automotive floor tubes are axially misaligned.

Referring next to FIG. 6, one form of the integrated fuel tube clamp assembly 1300 is shown in cutaway view where an axial misalignment M is present between the side-by-side floor tubes 185, 195 within their respective channels 325, 330 of a common clamp body 310 (shown presently in broken form for simplicity). Significantly, the length along the axial dimension A of the section 325 of clamp body 310 relative to that of the length along the same dimension of the corresponding section 373 of the quick connector 400 is such that one or two gaps G1, G2 form between adjacent walls. It is these gaps G1 and G2 that define the axially-compliant fit that is absent in the conventional clamp assembly of FIG. 3. In other words, by providing a length buffer between these sections 325, 373 via one or both of these gaps G1, G2, the clamp 300 and the quick connector 400 act as an integrated whole to facilitate ergonomically-compatible joining of both tubes 185, 195 of the floor tube set to their axially-aligned counterpart fuel tubes 180, 190 of the fuel tube set, thereby improving installer, manufacturer or assembler productivity while also reducing the chance of damage to the joined fuel line. The configuration depicted in FIGS. 6A and 6B correspond to the situation where little or no misalignment between laterally-adjacent floor tubes 180, 190 is present, while Throughout the present disclosure, although the fuel tubes 180, 190, floor tubes 185, 195 and clamp assembly 1300 are preferably discussed in terms of their applicability to a vehicular fuel system such as that used to provide gasoline, diesel or related fuels between a fuel tank and an internal combustion engine (ICE), it will be appreciated that they are equally applicable to other fluid-carrying conduit such as brake tubes, cooling system tubes or the like, and that all such variants are deemed to be within the scope of the present disclosure.

In one non-limiting form, dimensions associated with the assembly 1300 may include the following. With regard to the portion of the channel section 335 that receives third section 430 of the quick connector 400, the lateral width may be roughly 25 millimeters at is maximum width, including the expanded region 335A that permits the temporary outward flexing of the tab 510 of retaining clip 500, while the width not including the expanded region 335A is about 20 millimeters. Likewise, the axial length of channel section 335 is about 17 millimeters, and includes additional length near the corners 300A and 300B. The axial length of the third section 430 of quick connector 400 is about 13 millimeters, which gives an axially-compliant fit that permits gaps G1 and G2 of up to 4 millimeters. Importantly, these gaps G1, G2 allow an installer a significant degree of axial flexibility to accommodate situations where one of the floor tubes 185 extends a different distance along the fluid-flow dimension while still ensuring that contact at the corners is not sacrificed. By maintaining corner points of contact between the outer surface of section 430 of the quick connector 400 and the respective 300A and 300B of the inner surface of a channels section 335, misalignment of the floor tubes 185, 195 is avoided, especially when the axially-spaced mounts 345, 347 are included on the inner surface of the channel 335; such maintaining of proper alignment between the joined tubes 190, 195 helps reduce the likelihood of fuel leaking at the joint. Such a fit is best promoted when the outer diametric dimension of the section of quick connector 400 is made large enough to engage with these axially-spaced mounts 345, 347 such that contact is made, but not so large that an interference fit is formed.

The quick connectors 400 and retaining clips 500 significantly improve tube assembly efficiency relative to configurations that require tools, separate fasteners or the like, while the clamps 300 act as a protective enclosure against the ambient environment such as foreign object impact, exposure to road salt or other corrosive agents, or vibrations that are associated with the operation of a vehicle. Moreover, by maintaining each of the joined tubes (either fuel tube 180 to floor tube 185 or fuel tube 190 to floor tube 195) in a relatively straight (or "true") axial orientation, the quick connector 400 helps to provide an additional measure of fluid sealing to reduce leakage associated with the effects of these ambient conditions, as well as in the event of a vehicle crash or other disruptive event that may cause an otherwise secure fluid connection between the joined tubes to become compromised.

As depicted herein, the quick connector 400 defines a linear profile such that the fluid-flow dimension remains linear all of the way through the quick connector 400 body. Although not shown, the quick connector 400 may also define a configuration such that the end and section 410 that corresponds to the connection with the fuel tubes 180, 190 can be made to define a right-angle (or any other angle, for that matter) connection in situations that call for such construction. Because it is envisioned that the connection between section 410 and fuel tubes 180, 190 is already made at one end of the quick connector 400 prior to the insertion of the floor tubes 185, 195, and further may be the case that the connection between section 410 and fuel tubes 180, 190 is already secured to their respective automotive surface, both the straight-through and angled embodiments are deemed to be within the scope of the present disclosure.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An integrated clamp assembly for fluid tubes, the assembly comprising:
  a clamp body defining a plurality of side-by-side fluid tube-receiving channels therein;
  a plurality of quick connectors; and
  a plurality of retaining clips each cooperative with a respective one of the quick connectors such that a fluid tube-securing snap-fit engagement is formed between the plurality of retaining clips and the respective one of the quick connectors, wherein each of the quick connectors are sized and shaped to (a) provide a terminus for fluidly joined sections of the fluid tubes and (b) define an axially-compliant fit within a respective channel when situated therein such that the axially-compliant fit accommodates relative variations in the placement of the assembled quick connector, retaining clip and joined tube sections along a fluid-flow dimension within the channel that arise as a result of one of the fluid tubes projecting a different length along the fluid flow dimension than that of a laterally-adjacent fluid tube.

2. The assembly of claim 1, wherein both the quick connector and the channel define a plurality of sections along the fluid flow direction including a channel section and a quick connector section respectively.

3. The assembly of claim 2, wherein both the channel section and quick connector section that correspond to the placement of the retaining clip define a larger radial dimension than the other channel and quick connector sections in order to accommodate a radially-outward flexure of the retaining clip during placement of one of the fluid tubes within the quick connector.

4. The assembly of claim 3, wherein the axially-compliant fit takes place in the channel section that is defined by the larger radial dimension, and is formed by having the fluid-flow dimension of the corresponding quick connector section be smaller than the fluid-flow dimension of the respective channel.

5. The assembly of claim 4, wherein the smaller fluid-flow dimension of the quick connector section that corresponds to the axially-compliant fit permits up to 2 millimeters of movement in either direction along the fluid-flow dimension within the respective channel.

6. The assembly of claim 4, wherein the smaller fluid-flow dimension of the quick connector section that corresponds to the axially-compliant fit permits movement in either direction along the fluid-flow dimension within the respective channel that is up to about 12% of the length of the fluid-flow dimension within the respective channel.

7. The assembly of claim 1, wherein at least one section of the channel defines a plurality of radially-inward projections such that a plurality of axially sequential alignment contacts are formed between the outer surface of the quick connector and the radially-adjacent inner surfaces of that section of the channel.

8. The assembly of claim 1, wherein the clamp body defining a plurality of side-by-side fluid tube-receiving channels therein comprises no more than two side-by-side fluid tube-receiving channels.

9. The assembly of claim 1, further comprising tandem seals disposed along an inner surface of at least one section of the quick connector such that when a fluid tube is inserted therein, any fluid that is present in the fluid tube is substantially contained within a volumetric region formed between an open end of the fluid tube and the tandem seals.

10. The assembly of claim 1, further comprising a clamp cover cooperative with the clamp body to define when joined together at least a partial enclosure for the channels.

11. A fluid tube assembly comprising:
a plurality of first fluid tubes arranged in a substantially side-by-side relationship with one another in at least a terminal region thereof, each of the first fluid tubes defining a locking member on an outer surface thereof;
a plurality of second fluid tubes arranged in a substantially side-by-side relationship with one another in at least a terminal region thereof, each of the second fluid tubes configured to be fluidly joinable to a respective one of the first fluid tubes; and
an integrated clamp assembly comprising:
a clamp body defining a plurality of side-by-side fluid tube-receiving channels therein;
a plurality of quick connectors; and
a plurality of retaining clips each cooperative with a respective one of the quick connectors and one of the first fluid tubes such that a snap-fit engagement is formed between them, wherein each of the quick connectors are sized and shaped to (a) provide a locking connection with the first fluid tube and (b) define an axially-compliant fit within a respective one of the channels when situated therein such that the axially-compliant fit accommodates relative variations in the placement of the assembled quick connector, retaining clip and first fluid tube along a fluid-flow dimension that arise as a result of one of the first fluid tubes projecting a different length along the fluid flow dimension than that of a laterally-adjacent first fluid tube.

12. The fluid tube assembly of claim 11, wherein the first fluid tubes comprise automotive floor tubes and the second fuel tubes comprises automotive fuel tubes, and further wherein the clamp body defining a plurality of side-by-side fluid tube-receiving channels therein comprises no more than two side-by-side channels.

13. The fluid tube assembly of claim 11, wherein the axially-compliant fit takes place in a channel section that is sized to accept the retaining clip, one of the first fluid tubes and a corresponding section of the quick connector therein such that the fluid-flow dimension of the corresponding section of the quick connector is smaller than the fluid-flow dimension of the respective channel.

14. The fluid tube assembly of claim 13, wherein the smaller fluid-flow dimension of the quick connector section that corresponds to the axially-compliant fit permits up to 2 millimeters of movement in either direction along the fluid-flow dimension within the respective channel.

15. The fluid tube assembly of claim 13, wherein the smaller fluid-flow dimension of the quick connector section that corresponds to the axially-compliant fit permits movement in either direction along the fluid-flow dimension within the respective channel that is up to about 12% of the length of the fluid-flow dimension within the respective channel.

16. The fluid tube assembly of claim 11, further comprising tandem seals disposed along an inner surface of at least one section of the quick connector such that when one of the first fluid tubes is inserted therein, any fluid that is present in such fluid tube is substantially contained within a volumetric region formed between an open end of that fluid tube and the tandem seals.

17. A method of connecting automotive fuel tubes comprising:
providing a clamp body that defines a pair of side-by-side tube-receiving channels therein;
providing a pair of first fuel tubes that are arranged in a substantially side-by-side relationship with one another at least in their terminal region, each of the first fuel tubes defining a locking member defined on an outer surface thereof;
providing a pair of second fuel tubes arranged in a substantially side-by-side relationship with one another at least in their terminal region;
arranging for at least the terminal region of each of the pair of second fuel tubes to be securely received within one end of a corresponding quick connector;
placing each of the quick connectors into corresponding ones of the channels;
placing at least the terminal region of each of the pair of first fuel tubes into an opposing end of a respective one of the quick connectors such that each of the second fuel tubes is fluidly joined to a respective one of the first fuel tubes; and
securing each of the first fuel tubes to its respective quick connector through a retaining clip that is cooperative with both such that a resiliently-biased snap-fit that is formed in at least one of the retaining clip and the quick connector engages the locking member, at least one section of both the quick connector and the channel being sized and shaped to define an axially-compliant fit between them such that the axially-compliant fit accommodates relative variations in the placement of the secured quick connector, retaining clip and first fuel tube along a fluid-flow dimension that arise as a result of one of the first fuel tubes projecting a different length along the fluid flow dimension than that of the other first fuel tube.

18. The method of claim 17, wherein the first automotive fuel tubes comprise floor tubes and the second automotive fuel tubes comprise fuel tubes.

19. The method of claim 17, further comprising placing tandem seals along an inner surface of at least one section of each of the quick connectors such that when at least the terminal region of each of the pair of first fuel tubes is inserted therein, any fuel that is present in the joined first and second fuel tubes is substantially contained within a volumetric region formed between the tandem seals and the region adjacent the joined fuel tubes.

20. The method of claim 17, further comprising enhancing axial alignment of each quick connector within each corresponding channel by placing a series of guide mounts between an inner surface of each of the channels and an outer surface of each of the corresponding quick connectors along the fluid-flow dimension such that during placement of each of the quick connectors into corresponding ones of the channels, the quick connectors remain in substantial axial alignment with their respective channels.

\* \* \* \* \*